US012640409B2

(12) United States Patent
Okuyama et al.

(10) Patent No.: US 12,640,409 B2
(45) Date of Patent: May 26, 2026

(54) ABNORMALITY DETECTION METHOD, ABNORMALITY DETECTION DEVICE, ENERGY STORAGE APPARATUS, AND COMPUTER PROGRAM

(71) Applicant: GS Yuasa International Ltd., Kyoto (JP)

(72) Inventors: Ryoichi Okuyama, Kyoto (JP); Kazuya Okabe, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 446 days.

(21) Appl. No.: 18/250,502

(22) PCT Filed: Sep. 28, 2021

(86) PCT No.: PCT/JP2021/035488
§ 371 (c)(1),
(2) Date: Apr. 25, 2023

(87) PCT Pub. No.: WO2022/091673
PCT Pub. Date: May 5, 2022

(65) Prior Publication Data

US 2023/0402666 A1        Dec. 14, 2023

(30) Foreign Application Priority Data

Oct. 27, 2020    (JP) ................................. 2020-179812

(51) Int. Cl.
*H01M 10/48*        (2006.01)
*H01M 10/42*        (2006.01)
(52) U.S. Cl.
CPC ....... *H01M 10/48* (2013.01); *H01M 10/4285* (2013.01)

(58) Field of Classification Search
CPC ............. H01M 10/48; H01M 10/4285; H01M 2220/10; H01M 2220/00; H01M 2220/20; H01M 10/00; H01M 14/005
See application file for complete search history.

(56)            References Cited

U.S. PATENT DOCUMENTS

2010/0188048 A1*  7/2010  Nishino .............. H01M 10/052
                                                     429/231.95
2012/0105006 A1*  5/2012  Hara ..................... H01M 10/44
                                                     903/903
(Continued)

FOREIGN PATENT DOCUMENTS

JP        2006-012613 A      1/2006
JP        2010-027409 A      2/2010
(Continued)

OTHER PUBLICATIONS

International Search Report and Written Opinion for International Application No. PCT/JP2021/035488, dated Dec. 7, 2021, (7 pages), Japan Patent Office, Tokyo, Japan.

*Primary Examiner* — Catherine T. Rastovski
*Assistant Examiner* — Sharad Timilsina
(74) *Attorney, Agent, or Firm* — Buchalter LLP

(57)            ABSTRACT

An abnormality detection method detects abnormality of an assembled battery including energy storage devices by an abnormality detection device. Each energy storage device contains, as a positive active material, lithium iron phosphate and lithium transition metal oxide that allows insertion and extraction reaction of a lithium ion in a potential range higher than that of the lithium iron phosphate. A ratio of an amount of charge based on a total amount of the lithium transition metal oxide to an amount of charge based on a total amount of the positive active material in a charge-discharge range, in which the energy storage device is used, is 5% or more. The abnormality detection device acquires (Continued)

voltage of each of the energy storage devices near a charge end point in the charge-discharge range where the energy storage device is used and detects abnormality in the assembled battery using the acquired voltage of the energy storage devices.

11 Claims, 8 Drawing Sheets

(56)                    References Cited

U.S. PATENT DOCUMENTS

| 2012/0293126 | A1  | 11/2012 | Nakamoto et al. | |
| 2013/0314050 | A1* | 11/2013 | Matsubara | H02J 7/933 |
| | | | | 320/134 |
| 2015/0093645 | A1* | 4/2015 | Kawakami | H01M 4/366 |
| | | | | 429/221 |
| 2015/0188330 | A1  | 7/2015 | Nakamoto et al. | |
| 2016/0061908 | A1* | 3/2016 | Torai | G01R 31/3648 |
| | | | | 702/63 |
| 2016/0104880 | A1  | 4/2016 | Gao et al. | |
| 2018/0083279 | A1* | 3/2018 | Takami | H01M 50/213 |
| 2020/0395611 | A1* | 12/2020 | Aoki | H01M 4/525 |
| 2021/0218075 | A1* | 7/2021 | Grey | H01M 4/483 |

FOREIGN PATENT DOCUMENTS

| JP | 2010-032412 | A | | 2/2010 |
| JP | 2011-018547 | A | | 1/2011 |
| JP | 20110185474 | A | * | 1/2011 |
| JP | 2012-018775 | A | | 1/2012 |
| JP | 2012-043682 | A | | 3/2012 |
| JP | 2014-143208 | A | | 8/2014 |
| JP | 2016-081927 | A | | 5/2016 |
| JP | 2017-062892 | A | | 3/2017 |
| JP | 2017-091851 | A | | 5/2017 |

* cited by examiner

ABNORMALITY DETECTION METHOD, ABNORMALITY DETECTION DEVICE, ENERGY STORAGE APPARATUS, AND COMPUTER PROGRAM

CROSS REFERENCE TO RELATED APPLICATIONS

This application is a National Stage Application, filed under 35 U.S.C. § 371, of International Application No. PCT/JP2021/035488, filed Sep. 28, 2021, which international application claims priority to and the benefit of Japanese Application No. 2020-179812, filed Oct. 27, 2020; the contents of both of which as are hereby incorporated by reference in their entireties.

BACKGROUND

Technical Field

The present technique relates to an abnormality detection method for detecting abnormality of an assembled battery, an abnormality detection device, an energy storage apparatus, and a computer program.

Description of Related Art

In recent years, energy storage devices including a lithium ion secondary battery have been used in a wide range of fields such as a power supply for portable terminals including a notebook personal computer and a smartphone, a renewable energy storage system, and an IoT device power supply. Further, energy storage devices have been actively developed as a power source for a next-generation clean energy vehicle such as an electric vehicle (EV), a hybrid electric vehicle (HEV), or a plug-in hybrid electric vehicle (PHEV).

For a positive active material of a lithium ion secondary battery, lithium transition metal composite oxide such as lithium cobalt oxide, lithium nickel oxide, or lithium manganese oxide is used.

For the positive active material, in place of cobalt or the like, lithium iron phosphate containing iron, which is abundant as a resource and inexpensive, as a constituent element is also used (see, for example, Patent Document JP-A-2006-12613).

BRIEF SUMMARY

In a case where an assembled battery is configured by an energy storage device that uses lithium iron phosphate as a positive active material (by what is called an LFP battery), a change in voltage is small during charging and discharging, and it is difficult to estimate a state of the assembled battery based on the change in voltage.

An object of the present disclosure is to provide an abnormality detection method and the like capable of suitably detecting abnormality of an assembled battery.

In an abnormality detection method according to one aspect of the present disclosure, abnormality of an assembled battery including a plurality of energy storage devices is detected by an abnormality detection device. Each of the energy storage devices contains, as a positive active material, lithium iron phosphate and lithium transition metal oxide that allows insertion and extraction reaction of a lithium ion in a potential range higher than that of the lithium iron phosphate, and a ratio of an amount of charge based on a total amount of the lithium transition metal oxide to an amount of charge based on a total amount of the positive active material in a charge-discharge range, in which the energy storage device is used, is 5% or more. The abnormality detection device acquires voltage of each of the energy storage devices near a charge end point in the charge-discharge range where the energy storage device is used, and detects abnormality in the assembled battery using the acquired voltage of the energy storage devices.

According to the present disclosure, abnormality of an assembled battery can be suitably detected.

BRIEF DESCRIPTION OF THE FIGURES

FIG. 4 is a block diagram of an abnormality detection device and the like.

DETAILED DESCRIPTION OF VARIOUS EMBODIMENTS

Figure 1:
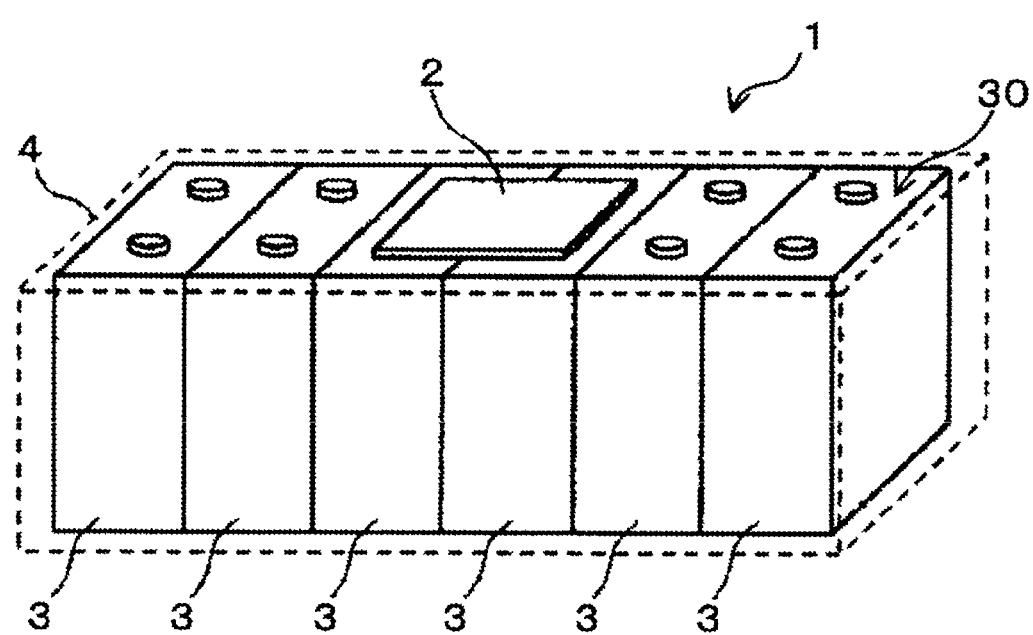
FIG. 1 is a diagram illustrating an example of an energy storage apparatus according to a first embodiment.

In an abnormality detection method, abnormality of an assembled battery including a plurality of energy storage devices is detected by an abnormality detection device. Each of the energy storage devices contains, as a positive active material, lithium iron phosphate and lithium transition metal oxide that allows insertion and extraction reaction of a lithium ion in a potential range higher than that of the lithium iron phosphate, and a ratio of an amount of charge based on a total amount of the lithium transition metal oxide to an amount of charge based on a total amount of the positive active material in a charge-discharge range, in which the energy storage device is used, is 5% or more. The abnormality detection device acquires voltage of each of the energy storage devices near a charge end point in the charge-discharge range where the energy storage device is used, and detects abnormality in the assembled battery using the acquired voltage of the energy storage devices.

In the present specification, the "abnormality of an assembled battery" includes a case where an internal short-circuit occurs in a part of a plurality of energy storage devices configuring the assembled battery, a case where capacity deterioration of a part of energy storage devices progresses beyond an allowable range compared to that of other energy storage devices, a case where a state of charge (SOC) of a part of energy storage devices deviates beyond an allowable range compared to that of other energy storage devices, and the like. The "abnormality of an assembled battery" includes a case where abnormality occurs in only a part of the energy storage devices configuring the assembled battery.

The "voltage" means a potential difference between a positive electrode potential and a negative electrode potential when a positive electrode containing a positive active material and a negative electrode containing a negative active material are combined to form an energy storage device.

The "potential" means a potential difference (V vs Li$^+$/Li) of each of a positive electrode simple substance and a negative electrode simple substance with respect to a Li reference electrode (standard electrode).

The "amount of charge" means a value calculated by multiplying mass (g) of a positive active material in an energy storage device by its theoretical capacity (Ah/g).

According to the above configuration, the assembled battery includes an energy storage device in which lithium iron phosphate and lithium transition metal oxide that allows insertion and extraction reaction of a lithium ion in a potential range higher than that of lithium iron phosphate are mixed as a positive active material. The energy storage device, which contains lithium iron phosphate in a positive active material, has a plateau region where voltage hardly changes in a wide range in charge-discharge characteristics. With the configuration in which lithium iron phosphate and lithium transition metal oxide are mixed, a region having a voltage change (slope that allows state estimation) based on insertion and extraction reaction of a lithium ion in the lithium transition metal oxide is formed near a charge end point. In the region, a state of the energy storage device can be estimated by detecting a change in voltage during charging and discharging. By acquiring voltage of each of the energy storage devices in the region, a state of each energy storage device can be accurately estimated, and abnormality of the assembled battery can be suitably detected based on a state difference between the energy storage devices.

The abnormality detection method may include detecting that an internal short-circuit occurs in at least one of the energy storage devices in a case where a voltage difference between the energy storage devices during insertion reaction (during discharge) of a lithium ion in the lithium transition metal oxide near the charge end point is a first threshold or more.

Since the charge-discharge characteristics have an inclination near the charge end point, it is possible to detect possibility that an internal short-circuit occurs in an energy storage device having a large voltage difference from other energy storage devices by using a voltage difference between the energy storage devices being discharged near the charge end point.

In the abnormality detection method, the first threshold may be a value larger than an operation threshold of a balancer that reduces a voltage difference between the energy storage devices during charge.

By setting the first threshold for detecting an internal short-circuit to be larger than an operation threshold of the balancer, it is possible to reduce possibility of erroneously determining that an internal short-circuit occurs in an energy storage device in which the internal short-circuit does not actually occur.

The abnormality detection method may include acquiring an integrated value of current associated with insertion reaction or extraction reaction of a lithium ion in the lithium transition metal oxide near the charge end point in the energy storage devices, and estimating a first deterioration degree of each of the energy storage devices based on the acquired integrated value of current.

Since the charge-discharge characteristics have an inclination that enables state estimation near the charge end point, the first deterioration degree of each of the energy storage devices can be estimated based on a current integrated value in the region. For example, the first deterioration degree of each of the energy storage devices can be estimated on the basis of behavior at the time of discharge reaching (decreasing) to voltage in a plateau region from voltage corresponding to an almost full charge state while voltage in each of the energy storage devices is acquired (monitored). The energy storage device 3 in which deterioration progresses is in a state where a charge end point is shifted to the left along the horizontal axis direction in FIG. 5, and reaches voltage in a plateau region earlier than another one of the energy storage devices 3. Abnormality of an assembled battery can be efficiently detected by charge and discharge near the charge end point.

The abnormality detection method may include detecting abnormality of the assembled battery based on a comparison between a first deterioration degree of one energy storage device in the assembled battery and a first deterioration degree of another energy storage device.

For example, abnormality of an assembled battery can be suitably detected based on a difference in the first deterioration degrees between the energy storage devices.

The abnormality detection method may include estimating a second deterioration degree of the energy storage devices based on a use history of the energy storage devices, and comparing the first deterioration degree and the second deterioration degree in each of the energy storage devices.

By comparing and collating the first deterioration degree and the second deterioration degree obtained by different methods, it is possible to estimate probability of the first deterioration degree and the second deterioration degree. For example, in a case where probability of the second deterioration degree estimated based on the use history is determined to be low in light of the first deterioration degree estimated based on charge and discharge near the charge end point, it is possible to cope with correction, update, or the like of the second deterioration degree based on the first deterioration degree.

The abnormality detection method may include acquiring voltage of each of the energy storage devices in a charge-discharge range of 3.2 V or more.

In a conventional LFP battery, voltage in a plateau region is approximately 3.2 V, and insertion and extraction reaction of a lithium ion occurs in the region. In a conventional LFP battery, full charge voltage is set to about 3.4 V. A voltage change between 3.2 V and 3.4 V does not depend on insertion and extraction reaction of a lithium ion, and is very steep. On the other hand, in a case where the positive active material contains lithium transition metal oxide that allows insertion and extraction reaction of a lithium ion in a voltage range higher than that of lithium iron phosphate, charge and discharge at 3.2 V or more are also caused by insertion and extraction reaction of a lithium ion. By acquiring voltage of each of the energy storage devices in this charge-discharge range, a state of each energy storage device can be accurately estimated.

The abnormality detection device detects abnormality of an assembled battery including a plurality of energy storage devices. Each of the energy storage devices contains, as a positive active material, lithium iron phosphate and lithium transition metal oxide that allows insertion and extraction reaction of a lithium ion in a potential range higher than that of the lithium iron phosphate, and a ratio of an amount of charge based on a total amount of the lithium transition metal oxide to an amount of charge based on a total amount of the positive active material in a charge-discharge range in which the energy storage device is used is 5% or more. The abnormality detection device includes an acquisition unit that acquires voltage of each of the energy storage devices near a charge end point in a charge-discharge range where the energy storage device is used, and a detection unit that detects abnormality in the assembled battery using the voltage of the energy storage devices acquired by the acquisition unit.

An energy storage apparatus includes an assembled battery including a plurality of energy storage devices, and the abnormality detection device described above.

A computer program causes a computer to detect abnormality of an assembled battery having a plurality of energy storage devices. Each of the energy storage devices contains, as a positive active material, lithium iron phosphate and lithium transition metal oxide that allows insertion and extraction reaction of a lithium ion in a potential range higher than that of the lithium iron phosphate, and a ratio of an amount of charge based on a total amount of the lithium transition metal oxide to an amount of charge based on a total amount of the positive active material in a charge-discharge range in which the energy storage device is used is 5% or more. The computer program causes the computer to execute processing of acquiring voltage of each of the energy storage devices near a charge end point in a charge-discharge range where the energy storage device is used, and detecting abnormality in the assembled battery using the acquired voltage of the energy storage devices.

Hereinafter, the present invention will be specifically described with reference to the drawings illustrating an embodiment of the present invention.

First Embodiment

FIG. 1 is a diagram illustrating an example of an energy storage apparatus 1 according to a first embodiment. The energy storage apparatus 1 includes an abnormality detection device 2, an assembled battery 30 including a plurality of energy storage devices 3, and a holder 4 that houses or holds the assembled battery 30. One of the assembled battery 30 is configured by connecting the energy storage devices 3. In the example of FIG. 1, one of the assembled battery 30 configured by six of the energy storage devices 3 connected in series is illustrated. Some of the energy storage devices 3 may be connected in parallel.

The abnormality detection device 2 is a circuit board having a flat plate shape which is arranged on upper surfaces of the energy storage devices 3, estimates a state of each of the energy storage device 3 at a predetermined timing, and detects abnormality of the assembled battery 30. Specifically, the abnormality detection device 2 acquires measurement data including voltage of the energy storage device 3 and current flowing through the energy storage device 3, and estimates a state of each of the energy storage device 3 based on the acquired measurement data. The abnormality detection device 2 detects abnormality of the energy storage device 3 and the assembled battery 30 based on a state of each of the energy storage device 3.

In FIG. 1, the abnormality detection device 2 is arranged near an upper surface of the energy storage device 3. Alternatively, the arrangement place may be near a side surface of the energy storage device 3 or near a lower surface of the energy storage device 3. A shape of the abnormality detection device 2 is not limited to a flat plate shape. The abnormality detection device may include a cell monitoring unit (CMU) and a battery management unit (BMU) communicable with a CMU. As illustrated in FIG. 1, the configuration may be such that only a CMU is arranged near the energy storage devices 3, and a BMU is arranged at a place away from the energy storage devices 3. In addition to a CMU and/or a BMU, the abnormality detection device 2 may include a server device which is located away from the energy storage device 3 and is communicably connected to a CMU or a BMU, or an electronic control unit (ECU). A place where abnormality detection of an assembled battery is performed is not limited, and for example, abnormality detection may be performed by a BMU, or may be performed by a server device or an ECU.

The energy storage device 3 is a battery cell such as a lithium ion secondary battery. The energy storage device 3 is applied to a power source for an automobile such as an electric vehicle (EV), a hybrid electric vehicle (HEV), or a plug-in hybrid electric vehicle (PHEV), a power source for an electronic device, a power source for power storage, and the like in a state of an assembled battery in which the energy storage devices 3 are electrically connected.

FIG. 1 illustrates a single energy storage module as the energy storage apparatus 1. Alternatively, the energy storage apparatus 1 may be what is called a high-voltage power supply such as an energy storage pack or an energy storage facility including a plurality of energy storage modules.

Figure 2:
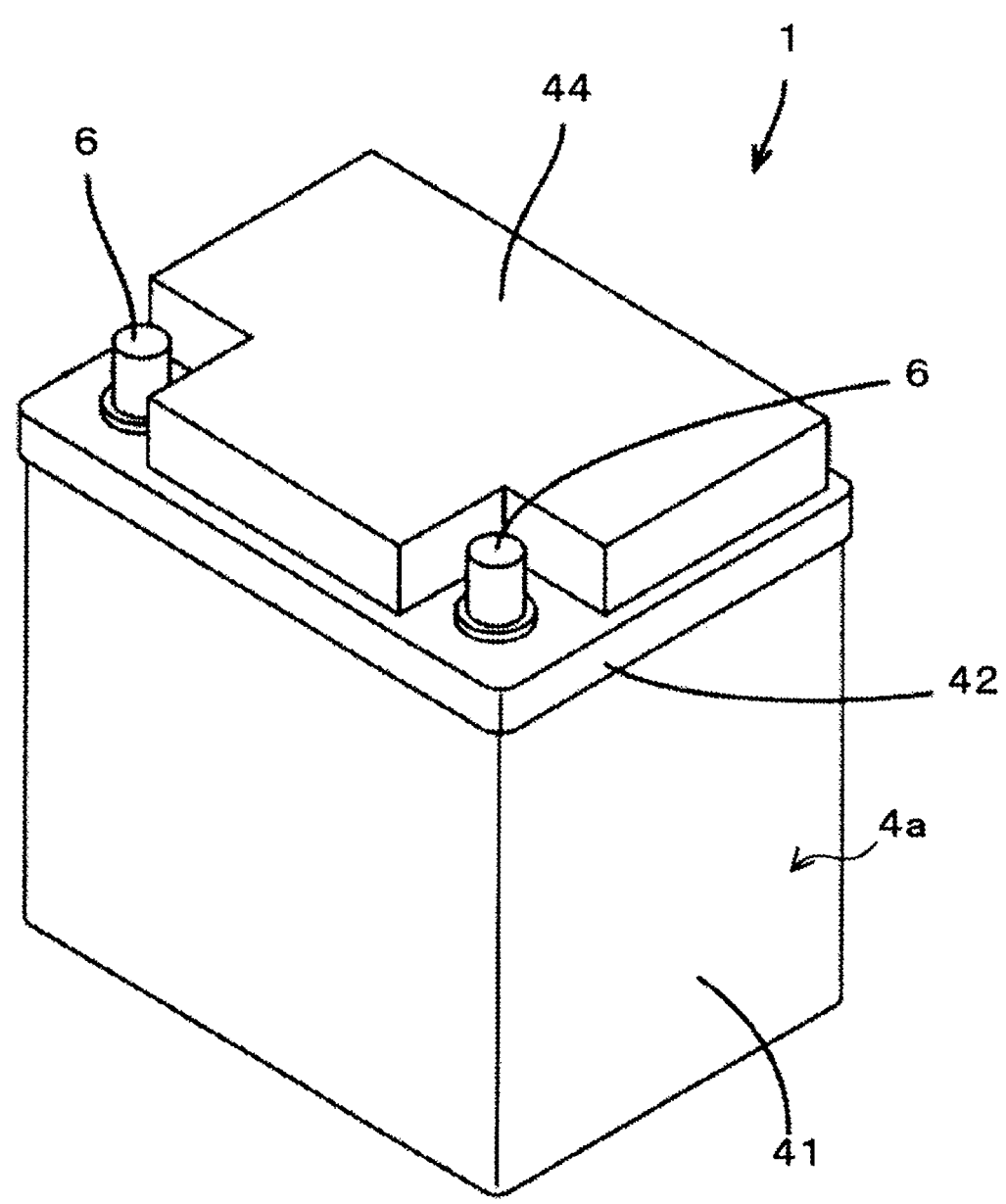
FIG. 2 is a perspective view illustrating another example of the energy storage apparatus.
Figure 3:
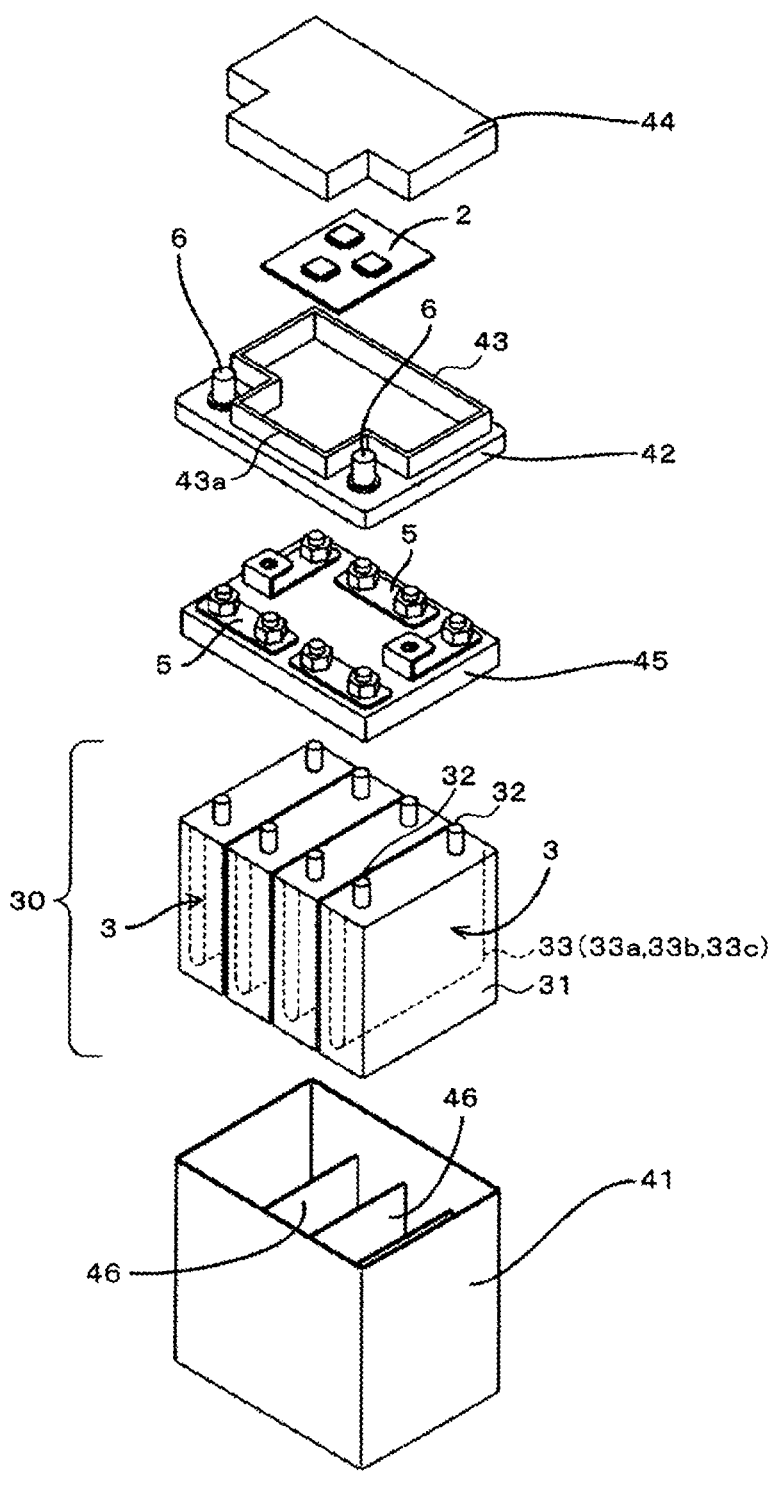
FIG. 3 is an exploded perspective view of the energy storage apparatus of FIG. 2.

FIGS. 2 and 3 illustrate another example of the energy storage apparatus 1, FIG. 2 is a perspective view of the energy storage apparatus 1, and FIG. 3 is an exploded perspective view of the energy storage apparatus 1. The energy storage apparatus 1 is what is called a low-voltage power supply such as a 12 V power supply or a 48 V power supply suitably mounted on an engine vehicle, an EV, an HEV, or a PHEV.

The energy storage apparatus 1 includes a rectangular parallelepiped housing case 4a that houses the abnormality detection device 2 and the assembled battery 30 including the energy storage devices 3. The abnormality detection device 2 is a BMU. The energy storage device 3 is a lithium ion secondary battery. The housing case 4a also houses a plurality of bus bars 5, a current sensor 7 (see FIG. 4), and the like. In FIGS. 2 and 3, the energy storage apparatus 1 is a 12 V power supply, and one of the assembled battery 30 configured by connecting four of the energy storage devices 3 in series is housed in the housing case 4a.

The housing case 4a is made from synthetic resin. The housing case 4a includes a case body 41, a lid portion 42 that closes an opening portion of the case body 41, a housing portion 43 provided on an outer surface of the lid portion 42, a cover 44 that covers the housing portion 43, an inner lid 45, and a partition plate 46. The inner lid 45 and the partition plate 46 do not need to be provided. The energy storage device 3 is inserted between the partition plates 46 of the case body 41.

The bus bars 5 made from metal are placed on the inner lid 45. The inner lid 45 is arranged near a terminal surface where a terminal 32 is provided of the energy storage device 3, the terminals 32 adjacent to each other of the energy storage devices 3 adjacent to each other are connected by the bus bar 5, and the energy storage devices 3 are connected in series.

The housing portion 43 has a box shape, and has a protruding portion 43a protruding outward at a central portion of one long side surface in plan view. On both sides of the protruding portion 43a of the lid portion 42, a pair of external terminals 6 and 6 made from metal such as a lead alloy and having different polarities are provided. The housing portion 43 accommodates the abnormality detection device 2. The abnormality detection device 2 is connected to the energy storage device 3 via a conductor (not illustrated). The abnormality detection device 2 manages a state of the energy storage devices 3 and controls each part of the energy storage apparatus 1.

The energy storage device 3 includes a case 31 having a hollow rectangular parallelepiped shape, and a pair of terminals 32 and 32 having different polarities and provided on one side surface (terminal surface) of the case 31. The case 31 houses an electrode assembly 33 formed by stacking a positive electrode 33a, a separator 33b, and a negative electrode 33c, and an electrolyte (electrolyte solution) (not illustrated).

The electrode assembly 33 is configured by placing the positive electrode 33a having a sheet-like shape on which a positive active material layer is formed and a negative electrode 33c having a sheet-like shape on which a negative active material layer is formed on top of each other with two of the separators 33b having a sheet-like shape interposed between them, and winding (longitudinally winding or transversely winding) these. The separator 33b is formed of a porous resin film. As the porous resin film, a porous resin film made from resin such as polyethylene (PE) or polypropylene (PP) can be used.

The positive active material layer contains a positive active material. The positive active material layer may further contain a conductive auxiliary agent, a binder, and the like. As the positive active material, a mixed positive active material containing a first positive active material as a main component and a second positive active material is used. Both the first positive active material and the second positive active material allows insertion and releasing of a lithium ion, and have different potential ranges in which insertion reaction and releasing reaction of a lithium ion occur. The second positive active material allows insertion and extraction reaction of a lithium ion in a potential range higher than that of the first positive active material. Note that the potential range associated with insertion and extraction reaction of a lithium ion will be described later.

The first positive active material is lithium iron phosphate (LiFePO$_4$) containing lithium and iron as constituent elements.

The second positive active material contains lithium and a transition metal element as constituent metal elements, and active material particles composed of lithium transition metal oxide (hereinafter, also referred to as a nonferrous lithium compound) having a higher potential of insertion and extraction reaction of a lithium ion than that of the first positive active material. Examples of the second positive active material include manganese-based lithium composite oxide, cobalt-based lithium composite oxide, and nickel-based lithium composite oxide. These oxides are typically represented by general formulae: $LiMnO_2$, $LiCoO_2$, $LiNiO_2$, $Li (Ni, Mn, Co) O_2$. The second positive active material according to the present embodiment does not exclude containing of a small amount of other elements as long as the effect of the present invention is not impaired. The second positive active material may form a solid solution.

The negative active material layer contains a negative active material. Examples of the negative active material include carbon materials such as graphite, hard carbon, and soft carbon. The negative active material layer may further contain a binder, a thickener, and the like.

As the electrolyte housed in the housing case 4a together with the electrode assembly 33, the same electrolyte as that of a conventional lithium ion secondary battery can be used. For example, an electrolyte containing a supporting electrolyte in an organic solvent can be used as the electrolyte. As the organic solvent, for example, an aprotic solvent such as carbonates, esters, and ethers are used. As the supporting electrolyte, for example, lithium salt such as LiPF$_6$, LiBF$_4$, or LiClO$_4$ is suitably used. The electrolyte may contain, for example, various additives such as a gas generating agent, a film forming agent, a dispersant, and a thickener.

In FIGS. 2 and 3, a prismatic lithium ion battery including the winding type electrode assembly 33 is described as an example of the energy storage device 3. Alternatively, the energy storage device 3 may be a cylindrical lithium ion battery. The energy storage device 3 may be a lithium ion battery including a stacking type electrode assembly, or may be a laminate type (pouch type) lithium ion battery or the like. Furthermore, the energy storage device 3 may be an all solid lithium ion battery using a solid electrolyte.

Figure 4:
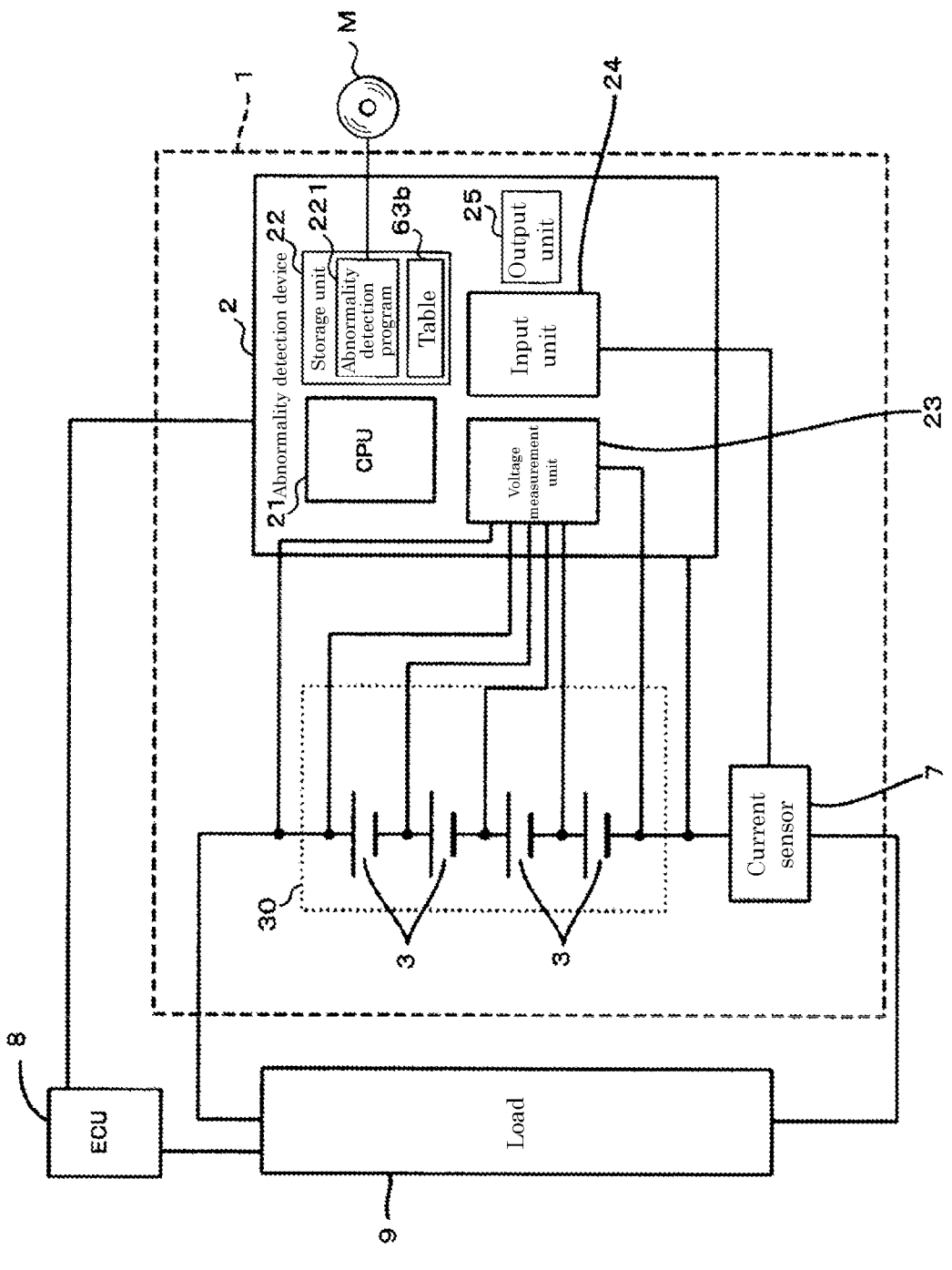

FIG. 4 is a block diagram of the abnormality detection device 2 and the like. The energy storage apparatus 1 including the abnormality detection device 2 is connected to a vehicle ECU 8 and a load 9 such as a starter motor for starting an engine and an electrical component. The abnormality detection device 2 includes a calculation unit 21, a storage unit 22, a voltage measurement unit 23, an input unit 24, an output unit 25, and the like.

The calculation unit 21 is an arithmetic circuit including a central processing unit (CPU), a read only memory (ROM), a random access memory (RAM), and the like. The CPU included in the calculation unit 21 executes various computer programs stored in the ROM or the storage unit 22 and controls operation of each of the hardware units described above, so as to cause the entire device to function as the abnormality detection device of the present disclosure. The calculation unit 21 may have a function of a timer that measures elapsed time from when a measurement start instruction is given to when a measurement end instruction is given, a counter that counts the number, a clock that outputs date and time information, and the like.

The storage unit 22 is a storage device such as a flash memory. The storage unit 22 stores various computer programs and data. The computer programs stored in the storage unit 22 include, for example, an abnormality detection program 221 for causing the calculation unit 21 to execute calculation relating to abnormality detection of the energy storage apparatus 1.

The abnormality detection program 221 is provided by, for example, a non-transitory recording medium M on which a computer program is recorded in a readable manner. The recording medium M is a portable memory such as a CD-ROM, a USB memory, or a secure digital (SD) card. The calculation unit 21 reads a desired computer program from the recording medium M using a reading device (not illustrated), and stores the read computer program in the storage unit 22. Alternatively, the computer program may be provided by communication.

The storage unit 22 may store a table indicating a relationship between voltage and an SOC of the energy storage device 3 to be described later.

The voltage measurement unit 23 is connected to both ends of the energy storage device 3 via a voltage detection line. The voltage measurement unit 23 measures a voltage value of each of the energy storage devices 3 at predetermined time intervals to acquire voltage of each of the energy storage devices 3 and total voltage of an assembled battery.

The calculation unit 21 acquires a voltage value through the voltage measurement unit 23.

The input unit 24 includes an interface for connecting the current sensor 7. The input unit 24 receives a signal related to current measured by the current sensor 7 at predetermined time intervals. The calculation unit 21 acquires a current value through the input unit 24.

A temperature sensor such as a thermocouple or a thermistor may be further connected to the input unit 24. The calculation unit 21 acquires temperature data of the energy storage device 3 or the energy storage apparatus 1 measured by the temperature sensor through the input unit 24.

The output unit 25 may be a communication unit or may include an interface for connecting an external device. An example of the external device is a display device (not illustrated) such as a liquid crystal display. Alternatively, the external device may be a terminal device (not illustrated) such as a computer or a smartphone used by the user. The calculation unit 21 outputs an abnormality detection result of the assembled battery 30 from the output unit 25 to the external device.

The energy storage apparatus 1 may include a balancer for reducing a voltage difference between the energy storage devices 3. The balancer is a circuit that includes a discharge load and a switch connected in parallel to each energy storage device, and causes current to flow through the discharge load to consume an electric quantity of the energy storage device. In a case where a voltage value of any one of the energy storage devices 3 is a predetermined value (operation threshold) or more, the calculation unit 21 operates the balancer of the energy storage device 3. In a case where the balancer operates and the switch is turned on, a part of current supplied from the outside of the energy storage device 3 for charging flows to the balancer, and an electric quantity is consumed.

The calculation unit 21 estimates a state of the energy storage device 3 based on acquired current value, voltage value, temperature, and the like, and detects abnormality of the energy storage apparatus 1.

Here, charge-discharge characteristics of the energy storage device using a mixed positive active material of the present embodiment will be described in detail.

First, charge-discharge characteristics in a case where lithium iron phosphate and a nonferrous lithium compound are used alone will be described. Hereinafter, as the charge-discharge characteristics, a charge-discharge curve representing a relationship between an SOC and voltage of the energy storage device will be described. The charge-discharge curve is a graph showing an SOC (%) on the horizontal axis and voltage (V) on the vertical axis.

For example, in a case of an LFP battery containing $LiFePO_4$ as a positive active material and graphite as a negative active material, an SOC-open circuit voltage (OCV) curve is obtained in which a plateau region where a voltage rise is extremely gentle exists in a wide range of SOC 5% to 95% after voltage rises at an initial stage of charge when the SOC is low, and the voltage rapidly rises at the end of charge. The voltage varies in a range of about 3.4 V or less and has a plateau region around 3.2 V. This plateau voltage is voltage at which insertion reaction or extraction reaction of a lithium ion occurs in $LiFePO_4$. Insertion reaction or extraction reaction of a lithium ion is almost completed at a plateau end point, and a subsequent voltage rise does not depend on insertion and extraction reaction of a lithium ion and is very steep. As described above, in a case where lithium iron phosphate is used alone, voltage hardly changes in a wide range of an SOC, and a range of an SOC in which a change in voltage can be detected is very narrow.

On the other hand, for example, in a case of a ternary battery containing $LiNi_{1/3}Mn_{1/3}Co_{1/3}O_2$ (NCM111) as a positive active material and graphite as a negative active material, an SOC-OCV curve in which voltage rises up to SOC 100% after voltage rises at an initial stage of charge is obtained. The voltage varies in a range of about 3.4 V to 4.1 V. As described above, in a case where a nonferrous lithium compound is used alone, a charge-discharge curve has a slope in a wide range of an SOC, and thus a change in voltage is easily detected.

The present inventors have focused on the fact that a potential range in which insertion and extraction reaction of a lithium ion is possible and degree of a potential change vary depending on a type of a positive active material. The present inventors have found that a nonferrous lithium compound having high potential that allows insertion and extraction reaction of a lithium ion is mixed with a positive active material containing lithium iron phosphate as a main component, a change in potential due to two or more types of positive active materials is reflected in a voltage change of a charge-discharge curve, a state of the energy storage device 3 is estimated using the change in voltage, and abnormality of the assembled battery 30 can be detected.

Figure 5:
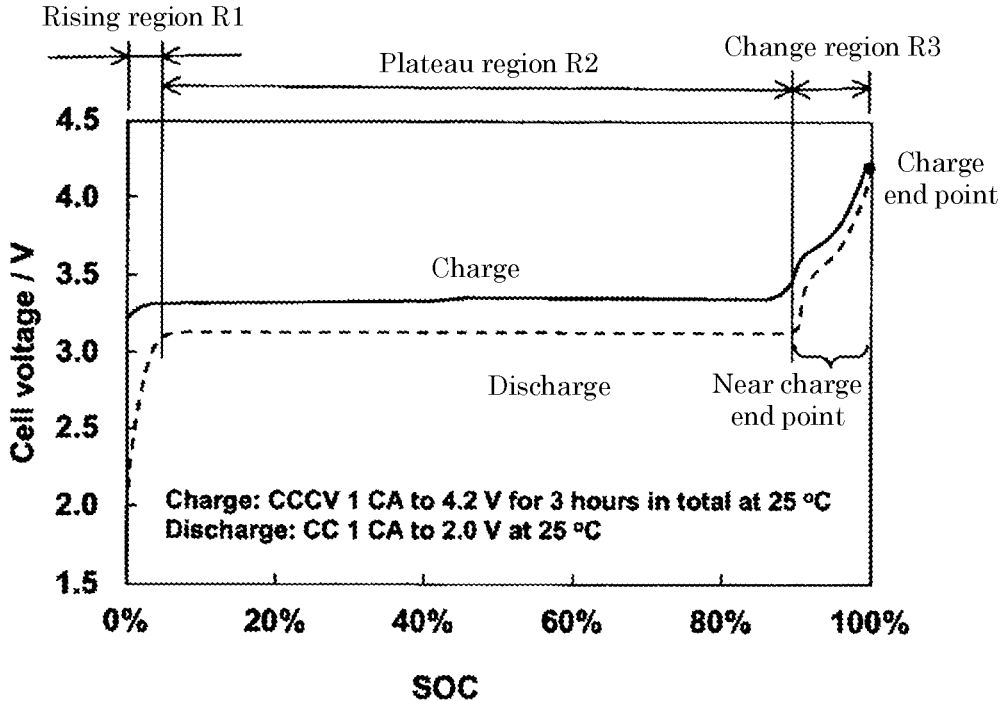
FIG. 5 is a charge-discharge curve showing a relationship between SOC and voltage for a mixed positive active material of lithium iron phosphate and a nonferrous lithium compound.

FIG. 5 is a charge-discharge curve showing a relationship between an SOC and voltage for a mixed positive active material of lithium iron phosphate and a nonferrous lithium compound. The horizontal axis represents an SOC (%), and the vertical axis represents voltage (V). A solid line in FIG. 5 indicates a charge curve, and a broken line indicates a discharge curve. Although not illustrated, a curve indicating OCV is located approximately in the middle between the charge curve and the discharge curve. As a positive active material, $LiFePO_4$ and NCM111 were used. Graphite was used as a negative active material. A ratio between an amount of charge based on a total amount of $LiFePO_4$ and an amount of charge based on a total amount of NCM111 is, for example, 90:10.

As illustrated in FIG. 5, in a case of using the mixed positive active material, a rising region R1 in which voltage rises, a plateau region R2 in which voltage hardly changes, and a change region R3 in which voltage rises (changes) with a slope are formed in the charge-discharge curve. In the example of FIG. 5, the rising region R1 is formed in a range of SOC 0% to less than about 5%, the plateau region R2 is formed in a range of SOC about 5% to less than 90%, and the change region R3 is formed in a range of SOC 90% to 100%. The rising region R1 and the plateau region R2 are in a range (SOC 0% to less than 90%) in which insertion and extraction of a lithium ion occur in $LiFePO_4$. The change region R3 is a range (SOC 90% to 100%) in which insertion and extraction of a lithium ion occur in the NCM111. In the example of FIG. 5, the change region R3 corresponds to a region near charge end point.

A change range of voltage in the rising region R1 and the plateau region R2 corresponds to a range of operating voltage (3.4 V or less) of an LFP battery. A change range in voltage in the change region R3 corresponds to a range of operating voltage (3.4 V to 4.2 V) of a ternary battery. The plateau region R2 is formed near voltage of 3.2 V.

The change region R3, that is, a region near a charge end point may be a charge-discharge range of 3.2 V or more.

In the present embodiment, by mixing $LiFePO_4$ and NCM111, a plateau end point of the plateau region is moved (shifted) in a direction of a lower SOC as compared with a case where $LiFePO_4$ is used alone. By the above, a range of the change region R3 formed near a charge end point can be widened, and increase in voltage in the change region R3 can be made gentle. A range of the change region R3 and an inclination of voltage are appropriately set according to a mixing ratio of LiFePO$_4$ and NCM111. By using a voltage change in the change region R3 near a charge end point, a state of the energy storage device 3 can be accurately estimated based on voltage, and abnormality of the assembled battery 30 may be suitably detected.

For a content ratio of a nonferrous lithium compound (second positive active material) in the present embodiment, an amount of charge based on a total amount of the non-ferrous lithium compound is preferably 5% or more with reference to an amount of charge based on a total amount of a positive active material. As the content ratio of the nonferrous lithium compound is higher, a change in voltage can be detected in a wider SOC range. For this reason, the content ratio of the nonferrous lithium compound is more preferably 10% or more. Further, when the content ratio of the nonferrous lithium compound is appropriate, an inclina-tion of the charge-discharge curve can be made appropriate, and predetermined safety of the energy storage device 3 can be secured. For this reason, the content ratio of the nonfer-rous lithium compound can be less than 30%, and is more preferably less than 20%.

The abnormality detection device 2 detects abnormality of the energy storage device 3 by measuring a voltage value of the energy storage device 3 in the change region R3 described above. In the present embodiment, abnormality relating to an internal short-circuit of the energy storage device 3 is detected. The abnormality detection device 2 acquires a voltage value of each of the energy storage devices 3 measured by the voltage measurement unit 23. By determining whether a difference in acquired voltage values between the energy storage devices 3 is equal to or larger than the first threshold, occurrence of an internal short-circuit of the energy storage devices 3 is detected. A voltage value of the energy storage device 3 in which an internal short-circuit occurs is lower than a voltage value of the normal energy storage device 3. Accordingly, occurrence of an internal short-circuit can be detected based on a voltage difference from another one of the energy storage devices 3. Since a voltage value is acquired in the change region R3, variation in a voltage value may be accurately detected. The first threshold is preferably 300 mV or less, and more preferably 50 mV or less and 20 mV or more from the viewpoint of accurately and reliably detecting an internal short-circuit.

When the energy storage apparatus 1 includes the bal-ancer, the first threshold used to detect an internal short-circuit is preferably larger than a second threshold used to determine whether or not to operate the balancer. For example, the abnormality detection device 2 outputs an operation instruction to the balancer in a case of determining that a difference in voltage values between the energy storage devices 3 is the second threshold or more during charge of the assembled battery 30. By operating the bal-ancer of the energy storage device 3 having a higher voltage value than the other ones of the energy storage devices 3, an electric quantity with respect to the energy storage device 3 having a higher voltage value is adjusted, and states of charge are equalized between the energy storage devices 3. By making the first threshold larger than the second thresh-old for operation of the balancer, occurrence of a voltage difference that is not eliminated by operation of the balancer can be detected as an internal short-circuit. The second threshold can be, for example, 10 mV.

Figure 6:
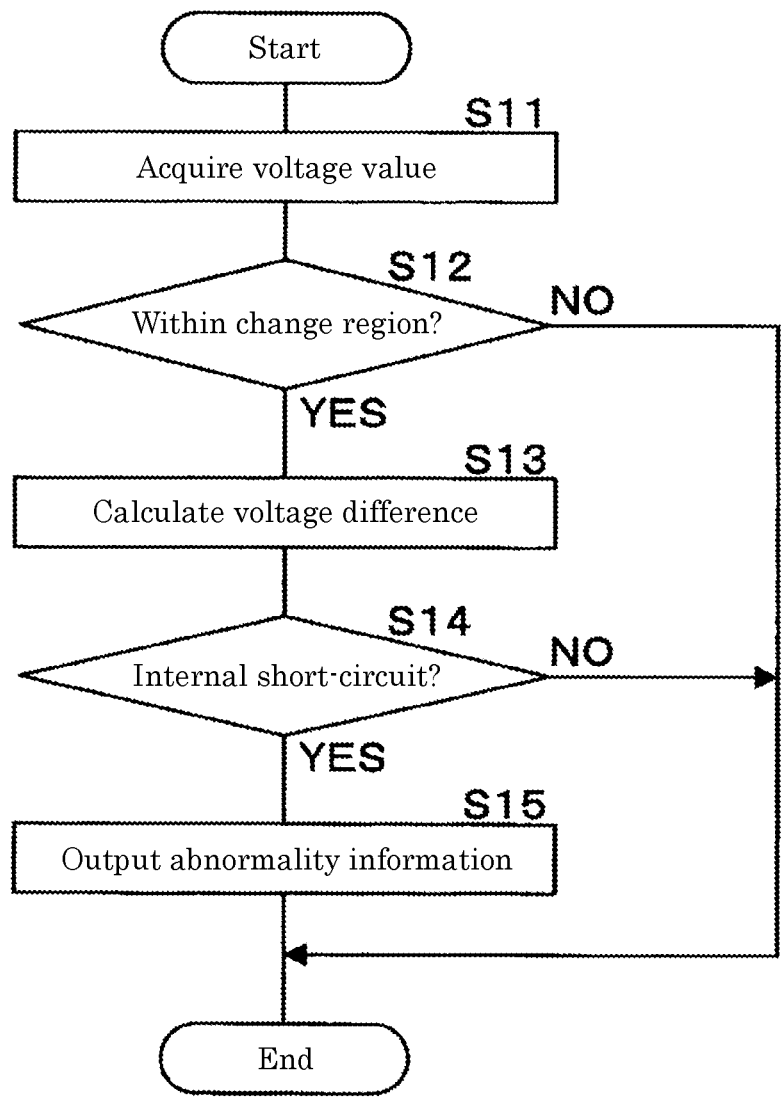
FIG. 6 is a flowchart illustrating an example of an abnormality detection processing procedure.

FIG. 6 is a flowchart illustrating an example of an abnormality detection processing procedure. The calculation unit 21 of the abnormality detection device 2 executes processing below at a predetermined timing according to the abnormality detection program 221.

During discharge of each of the energy storage devices 3 (during insertion reaction of a lithium ion into a positive active material), the calculation unit 21 acquires a voltage value between terminals of the energy storage devices 3 through the voltage measurement unit 23 (Step S11). In a case where the abnormality detection device 2 is installed at a remote place, the calculation unit 21 receives measurement data of the energy storage device 3 by communication via the output unit 25 (communication unit).

The calculation unit 21 determines a magnitude relation-ship between the acquired voltage value and a preset thresh-old, and determines whether or not the acquired voltage value is within the change region R3 (near a charge end point) (Step S12). In a case of determining that the voltage value is not within the change region R3 (Step S12: NO), the calculation unit 21 ends the processing. On the other hand, in a case of determining that the voltage value is within the change region R3 (Step S12: YES), the calculation unit 21 advances the processing and executes abnormality detection. The calculation unit 21 may execute the abnormality detec-tion in a case where one or more of the acquired voltage values is within the change region R3.

The calculation unit 21 calculates a voltage difference indicating a difference between a lowest voltage value and a highest voltage value based on the acquired voltage value of each of the energy storage devices 3 (Step S13). The calculation unit 21 identifies a lowest voltage value and a highest voltage value from among the acquired voltage values of the energy storage devices 3, and calculates a difference between the highest voltage value and the lowest voltage value to calculate a voltage difference.

The calculation unit 21 determines whether an internal short-circuit occurs based on the calculated voltage differ-ence (Step S14). Specifically, the calculation unit 21 deter-mines a magnitude relationship between the calculated volt-age difference and the first threshold set in advance, and determines whether the calculated voltage difference is equal to or more than the first threshold, so as to determine whether an internal short-circuit occurs.

In a case of determining that no internal short-circuit occurs because the calculated voltage difference is less than the first threshold (Step S14: NO), the calculation unit 21 ends the processing. The calculation unit 21 may output information indicating that the assembled battery 30 is normal through the output unit 25.

In a case of determining that an internal short-circuit occurs because the calculated voltage difference is the first threshold or more (Step S14: YES), the calculation unit 21 outputs abnormality information indicating that abnormality of the assembled battery 30 is detected through the output unit 25 (Step S15), and ends a series of pieces of the processing.

In the above-described processing, the calculation unit 21 may determine an abnormality level indicating degree of abnormality together with the presence or absence of abnor-mality of the assembled battery 30. The abnormality level is classified into a plurality of stages of high, medium, and low, for example. The calculation unit 21 determines the abnor-mality level based on a calculated voltage difference and a plurality of preset thresholds. The calculation unit 21 outputs abnormality information corresponding to the abnormality level. In a case where the abnormality level is medium or low, a warning message for notifying the abnormality level or a message for encouraging repair or replacement after a predetermined period elapses is output. In a case where the abnormality level is high, in cooperation with a device on which the assembled battery 30 is mounted, for example, a highly urgent warning message may be forcibly displayed on a display device or the like of a vehicle, or a control signal for safely stopping operation of a device may be output.

According to the present embodiment, in the assembled battery 30 including the energy storage devices 3, the change region R3 in which a voltage difference is easily detected can be formed near a charge end point by using a positive active material in which lithium iron phosphate as a main component and a nonferrous lithium compound are mixed. An internal short-circuit can be accurately detected based on a voltage difference detected in the change region R3.

In a charger for a 12 V lead-acid battery conventionally mounted in a vehicle, constant voltage charge of 14.8 V is performed. In a case where this charger is used in the energy storage apparatus 1 including the assembled battery 30 in which four of the energy storage devices 3 are connected in series, there is possibility that overcharge occurs in the energy storage device 3 using $LiFePO_4$ alone as a positive active material. By mixing $LiFePO_4$ and NCM111, voltage at which a battery is fully charged becomes high, so that a charger for a 12 V lead-acid battery may be suitably used.

In the present embodiment, the example in which the calculation unit 21 of the abnormality detection device 2 executes each piece of processing in the processing described in the flowchart of FIG. 6 is described. Alternatively, by the output unit 25 (communication unit) communicating with an external device (not illustrated), the calculation unit 21 of the abnormality detection device 2 may execute the processing in cooperation. A processing subject that performs abnormality detection is not limited to the abnormality detection device 2.

Second Embodiment

In a second embodiment, abnormality related to a deterioration degree of the energy storage device 3 is detected. Hereinafter, a difference from the first embodiment will be mainly described, and a configuration common to the first embodiment will be denoted by the same reference numeral, and a detailed description of the configuration will be omitted.

The deterioration degree may be full charge capacity or a capacity retention ratio of the energy storage device 3. The capacity retention ratio is also referred to as a state of health (SOH), and is a ratio of full charge capacity at the time of deterioration to initial full charge capacity of the energy storage device 3. The abnormality detection device 2 estimates a deterioration degree of each of the energy storage devices 3 by executing charge and discharge in the change region R3 (near the charge end point), and detects abnormality of the assembled battery 30 based on whether or not a deterioration degree of a part of the energy storage devices 3 progresses beyond an allowable range compared to another one of the energy storage devices 3.

Figure 7:
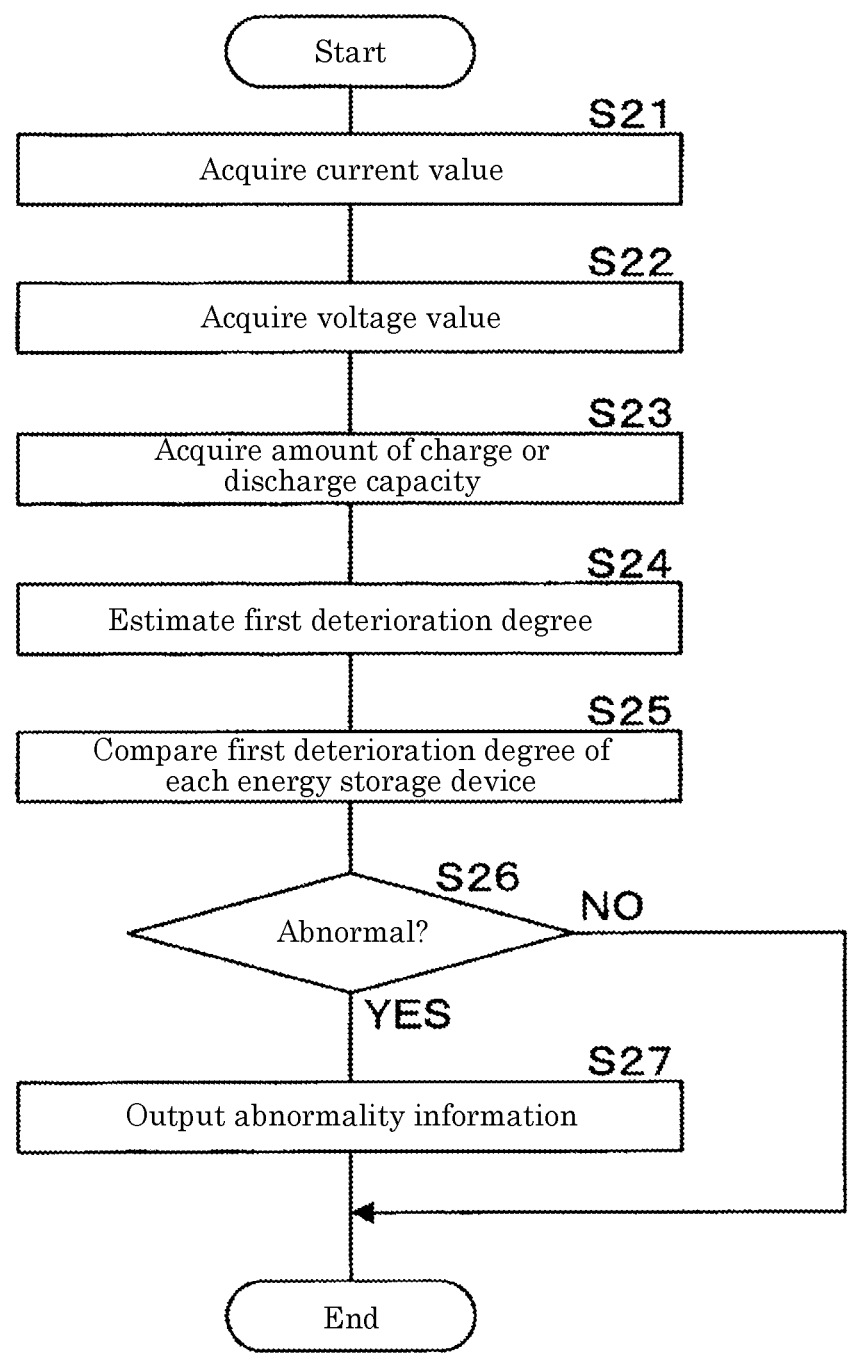
FIG. 7 is a flowchart illustrating an example of the abnormality detection processing procedure according to a second embodiment.

FIG. 7 is a flowchart illustrating an example of the abnormality detection processing procedure according to the second embodiment. In charge and discharge of each of the energy storage devices 3, the calculation unit 21 of the abnormality detection device 2 executes processing below according to the abnormality detection program 221. Hereinafter, processing of estimating the capacity retention ratio as a deterioration degree will be described.

In each of the energy storage devices 3, charge and discharge are performed in the change region R3. The calculation unit 21 acquires a current value of the assembled battery 30 through the input unit 24 at predetermined intervals during charge and discharge (Step S21). Further, the calculation unit 21 acquires a voltage value between terminals of each of the energy storage devices 3 through the voltage measurement unit 23 (Step S22).

Based on the acquired current value and voltage value, the calculation unit 21 acquires an amount of charge or discharge capacity of each of the energy storage devices 3 in the change region R3 (near a charge end point) (Step S23).

The calculation unit 21 estimates a first deterioration degree (SOH) in each of the energy storage devices 3 (Step S24). For example, the first deterioration degree of each of the energy storage devices 3 can be estimated on the basis of behavior at the time of discharge reaching (decreasing) to voltage in a plateau region from voltage corresponding to a full charge state. The energy storage device 3 in which deterioration progresses is in a state where a charge end point is shifted to the left along the horizontal axis direction in FIG. 5, and reaches voltage in a plateau region earlier than another one of the energy storage devices 3.

The calculation unit 21 compares the estimated first deterioration degree of each of the energy storage devices 3 (Step S25), and determines whether or not the assembled battery 30 is abnormal (Step S26). To be more specific, the calculation unit 21 identifies a highest value and a lowest value from among the acquired first deterioration degrees SOH of the energy storage devices 3, and calculates a difference between the highest value and the lowest value. The calculation unit 21 determines the presence or absence of abnormality by determining whether or not the calculated difference between the highest value and lowest value is equal to or more than a threshold. In a case where the difference between the highest value and the lowest value is equal to or more than the threshold, it is determined that there is abnormality. In a case where the difference between the highest value and the lowest value is less than the threshold, it is determined that there is no abnormality.

In a case of determining that the assembled battery 30 is not abnormal (Step S26: NO), the calculation unit 21 ends the processing. The calculation unit 21 may output information indicating that the assembled battery 30 is normal through the output unit 25.

In a case of determining that the assembled battery 30 is abnormal (Step S26: YES), the calculation unit 21 outputs abnormality information indicating that abnormality of the assembled battery 30 is detected through the output unit 25 (Step S27), and ends a series of pieces of the processing.

In the above description, abnormality is determined by a difference between a highest value and a lowest value. Alternatively, the calculation unit 21 may identify a reference first deterioration degree (for example, a highest value or a lowest value) from among the acquired first deterioration degrees of the energy storage devices 3, calculate a difference between the identified reference first deterioration degree and the first deterioration degree of another one of the energy storage devices 3, and determine a threshold. The abnormality detection only needs to detect a state difference between the energy storage devices 3.

In the above, the capacity retention ratio (deterioration degree) is estimated as a state of the energy storage device 3. Alternatively, the calculation unit 21 may estimate a state of charge (SOC) as a state of the energy storage device 3. For example, the SOC is calculated using Equation (1) below.

$$SOC_i = SOC_{i-1} + I_i \times \Delta t_i / Q \times 100 \tag{1}$$

$SOC_i$ is a current SOC, $SOC_{i-1}$ is a previous SOC, $I_i$ is a current value, $\Delta t_i$ is a time interval, and Q is a full charge capacity.

Abnormality of the assembled battery 30 may be detected in a case where an SOC of some of the energy storage devices 3 deviates more than an SOC of another one of the energy storage devices 3 beyond an allowable range.

According to the present embodiment, by acquiring an integrated value of current in the change region R3, the first deterioration degree can be suitably estimated, and abnormality of the assembled battery 30 can be detected. In a case where lithium iron phosphate is used alone, a plateau region where a voltage change is small is wide, and deterioration degree of the energy storage device 3 can be estimated only by performing substantially complete charge and discharge (what is called capacity check). According to the present embodiment, by using a voltage change in the change region R3, it is easy to determine the start and end of the change region R3, and thus, it is possible to efficiently estimate deterioration degree of the energy storage device 3 by partial charge-di s charge.

Third Embodiment

In a third embodiment, deterioration degrees estimated by different methods are compared. Hereinafter, a difference from the second embodiment will be mainly described, and a configuration common to the first embodiment will be denoted by the same reference numeral, and a detailed description of the configuration will be omitted.

The calculation unit 21 compares the first deterioration degree estimated from an integrated value of current in the change region R3 with a second deterioration degree obtained by a method different from the estimation method for the first deterioration degree, so as to estimate probability of the second deterioration degree.

Figure 8:
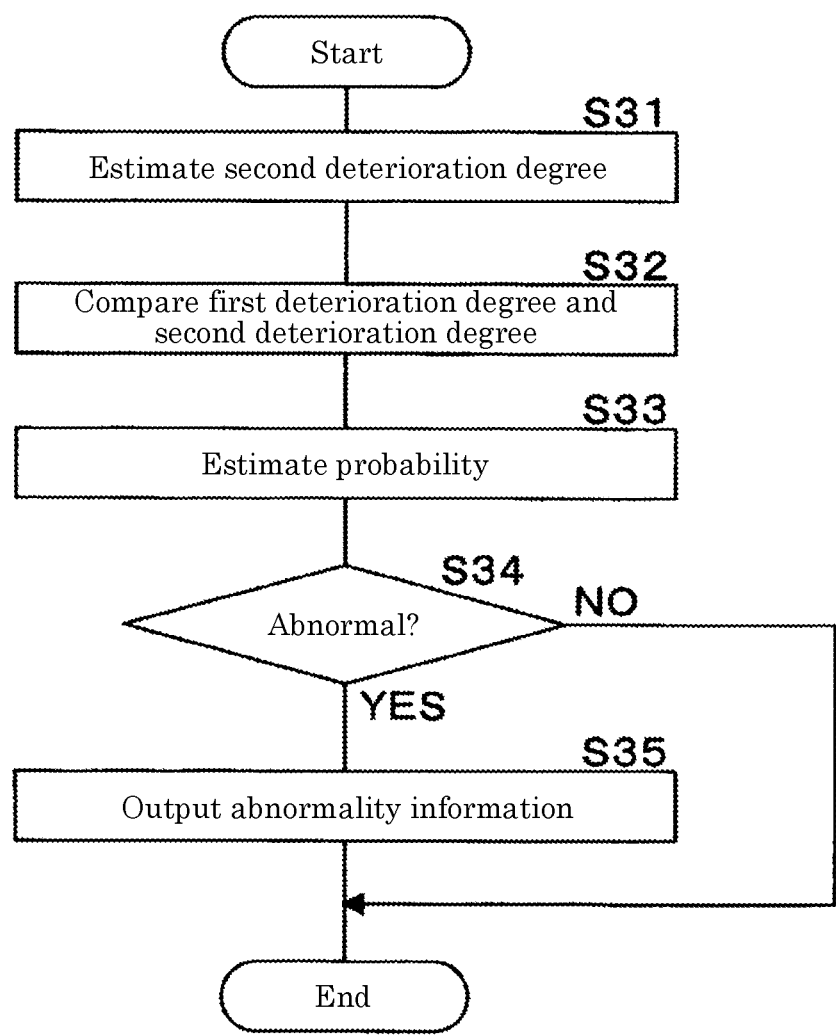
FIG. 8 is a flowchart illustrating an example of an abnormality detection processing procedure according to a third embodiment.

FIG. 8 is a flowchart illustrating an example of the abnormality detection processing procedure according to the third embodiment. The calculation unit 21 of the abnormality detection device 2 executes processing below at a predetermined timing according to the abnormality detection program 221. Hereinafter, an example of estimating an SOH as the first deterioration degree and the second deterioration degree will be described.

The calculation unit 21 estimates the second deterioration degree (Step S31). An estimation method for the second deterioration degree is not particularly limited. For example, the second deterioration degree may be sequentially calculated and stored by a mathematical model using actual measurement data of a use history of the energy storage device 3. Use history data includes a current value, a voltage value, temperature, use time, and the like. The calculation unit 21 distinguishes between electrification deterioration and non-electrification deterioration, calculates deterioration degrees of them based on a root law, and integrates these deterioration degrees to calculate the second deterioration degree. The second deterioration degree is calculated for each of the first positive active material and the second positive active material.

The calculation unit 21 compares the first deterioration degree with the second deterioration degree related to the second positive active material (Step S32), and estimates probability of the second deterioration degree related to the second positive active material (Step S33). The probability may be estimated based on an error between the first deterioration degree and the second deterioration degree. For example, the calculation unit 21 determines that the probability is high in a case where the error is less than a predetermined value, and determines that the probability is low in a case where the error is equal to or more than the predetermined value. Alternatively, the probability may be classified into three or more stages, and may be indicated by a numerical value.

The calculation unit 21 determines whether an estimation result for the second deterioration degree is abnormal based on the estimated probability (Step S34). In a case of determining that the estimation result for the second deterioration degree is not abnormal (Step S34: NO), the calculation unit 21 ends the processing. On the other hand, in a case where the estimation result for the second deterioration degree is determined to be abnormal (Step S34: YES), abnormality information indicating that the estimation result for the second deterioration degree is abnormal (probability is low) is output (Step S35), and a series of pieces of the processing ends.

In the above-described processing, in a case of determining that the probability of the second deterioration degree is low and the estimation result is abnormal, the calculation unit 21 may update or reset the second deterioration degree related to the second positive active material based on the first deterioration degree. After updating or resetting the second deterioration degree, the calculation unit 21 may resume estimation of the second deterioration degree using the updated second deterioration degree as a new reference value.

The calculation unit 21 may use the probability of the second deterioration degree related to the second positive active material for estimating probability of the second deterioration degree related to the first positive active material. The calculation unit 21 may update or reset the second deterioration degree related to the first positive active material according to the probability of the second deterioration degree. An SOH derived from the first positive active material and an SOH derived from the second positive active material obtained as the first deterioration degree do not strictly match. However, in the energy storage device 3 of a single body, the processing can be progressed assuming that these SOHs are substantially the same. This makes it possible to obtain the probability of the second deterioration degree relating to the first positive active material without comparing the first deterioration degree and the second deterioration degree of the first positive active material.

According to the present embodiment, by taking a difference between deterioration degrees by two different methods, it is possible to determine that there is abnormality in a case where there is a deviation between two values. Since the second deterioration degree is an estimated value obtained based on a use history, there is a concern that an estimation error of the estimation value increases over time. By performing comparison and collation using the first deterioration degree according to actual use, the second deterioration degree can be appropriately updated (corrected).

The embodiments disclosed this time are illustrative in all respects and not restrictive. The scope of the present invention is defined by the claims, and includes meanings equivalent to the claims and all changes within the scope.

The invention claimed is:

1. An abnormality detection method of detecting abnormality of an assembled battery including a plurality of energy storage devices by an abnormality detection device, comprising:

acquiring voltage of each of the energy storage devices with a charge of 90% or more in a charge-discharge range in which the energy storage device is used; and detecting abnormality of the assembled battery using the acquired voltage of the energy storage devices, wherein:

each of the energy storage devices contains, as a positive active material, lithium iron phosphate and lithium transition metal oxide that allows insertion and extraction reaction of a lithium ion in a potential range higher than that of the lithium iron phosphate, and a ratio of an amount of charge based on a total amount of the lithium transition metal oxide to an amount of charge based on a total amount of the positive active material in the charge-discharge range, in which the energy storage device is used, is 5% or more.

2. The abnormality detection method according to claim 1, further comprising:

detecting that an internal short-circuit occurs in at least one of the energy storage devices in a case where a voltage difference between the energy storage devices during insertion reaction of a lithium ion in the lithium transition metal oxide with the charge of 90% or more is a first threshold or more.

3. The abnormality detection method according to claim 2, wherein:

the first threshold is a value larger than an operation threshold of a balancer circuit that reduces a voltage difference between the energy storage devices during charge.

4. The abnormality detection method according to claim 1, further comprising:

acquiring an integrated value of current associated with insertion reaction or extraction reaction of a lithium ion in the lithium transition metal oxide with the charge of 90% or more in the energy storage devices; and estimating a first deterioration degree of each of the energy storage devices based on the acquired integrated value of current.

5. The abnormality detection method according to claim 4, further comprising:

detecting abnormality of the assembled battery based on a comparison between a first deterioration degree of one energy storage device in the assembled battery and a first deterioration degree of another energy storage device.

6. The abnormality detection method according to claim 4, further comprising:

estimating a second deterioration degree of the energy storage devices based on a use history of the energy storage devices; and comparing the first deterioration degree and the second deterioration degree in each of the plurality of energy storage devices.

7. The abnormality detection method according to claim 1, further comprising:

acquiring voltage of each of the energy storage devices in a charge-discharge range of 3.2 V or more.

8. An abnormality detection device that detects abnormality of an assembled battery including a plurality of energy storage devices, comprising:

a processor adapted to acquire voltage of each of the energy storage devices with a charge of 90% or more in a charge-discharge range in which the energy storage device is used; and detect abnormality of the assembled battery using the acquired voltage of the energy storage devices, wherein:

each of the energy storage devices contains, as a positive active material, lithium iron phosphate and lithium transition metal oxide that allows insertion and extraction reaction of a lithium ion in a potential range higher than that of the lithium iron phosphate, and a ratio of an amount of charge based on a total amount of the lithium transition metal oxide to an amount of charge based on a total amount of the positive active material in the charge-discharge range, in which the energy storage device is used, is 5% or more.

9. An energy storage apparatus comprising:

an assembled battery including a plurality of energy storage devices; and the abnormality detection device according to claim 8.

10. A non-transitory computer-readable medium that stores a computer program that causes a computer to detect abnormality of an assembled battery including a plurality of energy storage devices, the computer program causing the computer to execute processing when executed on a processor of:

acquiring voltage of each of the energy storage devices with a charge of 90% or more in a charge-discharge range in which the energy storage device is used; and detecting abnormality of the assembled battery using the acquired voltage of the energy storage devices, wherein:

each of the energy storage devices contains, as a positive active material, lithium iron phosphate and lithium transition metal oxide that allows insertion and extraction reaction of a lithium ion in a potential range higher than that of the lithium iron phosphate, and a ratio of an amount of charge based on a total amount of the lithium transition metal oxide to an amount of charge based on a total amount of the positive active material in the charge-discharge range, in which the energy storage device is used, is 5% or more.

11. The abnormality detection method according to claim 5, further comprising:

estimating a second deterioration degree of the energy storage devices based on a use history of the energy storage devices; and comparing the first deterioration degree and the second deterioration degree in each of the plurality of energy storage devices.

* * * * *